United States Patent
Rudy et al.

(10) Patent No.: US 6,445,536 B1
(45) Date of Patent: Sep. 3, 2002

(54) DIELECTRIC STENCIL-DEFINED WRITE HEAD FOR MR, GMR, AND SPIN VALVE HIGH DENSITY RECORDING HEADS

(75) Inventors: Steven C. Rudy, San Jose; Hugh C. Hiner; Lien-Chang Wang, both of Fremont, all of CA (US); Yong Shen, New Territory (HK); Ut Tran, San Jose, CA (US); Yunju Ra, Irvine, CA (US); Durga Ravipati, Saratoga, CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/140,903

(22) Filed: Aug. 27, 1998

(51) Int. Cl.⁷ .................................................. G11B 5/33
(52) U.S. Cl. ...................................................... 360/126
(58) Field of Search .................................. 360/126, 119

(56) References Cited

U.S. PATENT DOCUMENTS

| | | | | |
|---|---|---|---|---|
| 4,947,541 A | * | 8/1990 | Toyoda et al. | 29/603.14 |
| 5,283,942 A | * | 2/1994 | Chen et al. | 29/603.18 |
| 5,285,340 A | * | 2/1994 | Ju et al. | 360/119 |
| 5,406,434 A | * | 4/1995 | Amin et al. | 360/122 |
| 5,473,491 A | * | 12/1995 | Fujisawa et al. | 360/126 |
| 5,479,696 A | * | 1/1996 | McNeil | 29/603.2 |
| 5,590,008 A | * | 12/1996 | Tanabe et al. | 360/126 |
| 5,695,656 A | * | 12/1997 | Park et al. | 216/22 |
| 5,802,700 A | * | 9/1998 | Chen et al. | 29/603.14 |
| 5,872,693 A | * | 2/1999 | Yoda et al. | 360/126 |
| 5,874,010 A | * | 2/1999 | Tao et al. | 216/22 |
| 5,926,348 A | * | 7/1999 | Shouji et al. | 360/327 |
| 5,966,800 A | * | 10/1999 | Huai et al. | 29/603.13 |
| 5,997,381 A | * | 12/1999 | Dee et al. | 451/5 |
| 6,043,959 A | * | 3/2000 | Crue et al. | 360/317 |
| 6,104,576 A | * | 8/2000 | Santini | 360/126 |
| 6,108,167 A | * | 8/2000 | Tateyama et al. | 360/126 |
| 6,169,642 B1 | * | 1/2001 | Mino et al. | 360/126 |
| 6,195,229 B1 | * | 2/2001 | Shen et al. | 216/22 |
| 6,295,186 B1 | * | 9/2001 | Hasegawa et al. | 360/324.11 |
| 6,304,415 B1 | * | 10/2001 | Tateyama et al. | 360/126 |
| 6,305,072 B1 | * | 10/2001 | Yoda et al. | 29/603.14 |

FOREIGN PATENT DOCUMENTS

JP            3-252907      * 11/1991

* cited by examiner

*Primary Examiner*—Brian E. Miller

(57) ABSTRACT

A thin film head apparatus and method for forming such a thin film head. In one approach, the present invention recites forming a cavity in a dielectric layer. Next, a layer of high magnetic field saturation (HBsat) material is sputter-deposited over the dielectric layer such that the HBsat material is deposited into the cavity formed in the dielectric layer. The cavity in the dielectric layer functions as a mold or "stencil" for the HBsat material. The HBsat material deposited into the cavity is used to form the first core of a thin film head. After the formation of the first core of the thin film head, a gap layer of material is deposited above the dielectric layer and above the first core. Next, a layer of HBsat material is sputter-deposited above the gap layer of material and above the first core of the thin film head. The layer of HBsat material disposed above the gap layer of material and above the first core is used to form the second core of the thin film head. Hence, this invention forms first and second cores of a thin film head using sputter deposition processes. As a result, selected HBsat materials which were not well suited to conventional thin film head formation methods can now be used to form the cores of thin film head structures.

10 Claims, 5 Drawing Sheets

DIELECTRIC STENCIL-DEFINED WRITE HEAD FOR MR, GMR, AND SPIN VALVE HIGH DENSITY RECORDING HEADS

TECHNICAL FIELD

The present invention relates to thin film magnetic structures. In particular, the present invention pertains to a thin film inductive write head.

BACKGROUND ART

Numerous inductive head formation processes are well known in the art. Unfortunately, many of these conventional inductive head formation processes are limited to use with only certain materials. That is, typical prior art inductive head formation processes utilize only materials having physical properties and characteristics which are conducive to manufacturing conditions and parameters associated with such prior art inductive head formation processes. For example, U.S. Pat. No. 5,283,942 to Chen et al. recites the use of a sacrificial layer in planarization schemes to generate narrow write trackwidth devices through the use of staggered poles or subtractive etching of a multi-layered pole structure. In the former case, this sacrificial layer is removed to the write gap and the P2 pole is staggered so as to fill only a portion of the resultant cavity. In the latter case, the sacrificial layer is removed only to the upper surface of an initial P2 pole layer, and a key feature of the claimed structure is the substantially equal width of the P1 and P2 poles at the write gap in conjunction with a substantially vertical profile of each. With use of ion milling to provide a self-aligned pole structure with P1 and P2 of substantially equal width at the write gap, progressively greater removal of the shield 2 is experienced with distance from the P1 pole as the desired step of 2 or more write gap lengths at the P1 pole is generated. Limiting such removal to an acceptably small range is one of the primary obstacles to successful use of this approach. This can prevent the use of such a process as the designed separation of the read sensor from the write gap is reduced to minimize the positional offset of read and write functions when the head is not positioned with the read and write transducers aligned tangential to the data track (as when a rotary actuator is used).

Further, U.S. Pat. No. 5,285,340 to Ju et al. recites the use of a chemical etching process to produce a cavity on a patternable dielectric material. This cavity is substantially filled by electroplating a first pole layer, a non-magnetic write gap, and a second pole layer. A final P2 element is stitched in to the remaining cavity to complete the transducer. Again, a key feature of the claims is the substantially equal width of the P1 and P2 poles at the write gap in conjunction with a substantially vertical profile of each. Write gap thickness is typically in the range of 1000–5000 angstroms and it is desirable to control this to a tolerance of approximately 200 angstroms or better. Measurement and control of a plated write gap in such an approach can complicate the process requirements for the device or limit the range of the application of this technique as such tight control of thin plated layers can be difficult.

Additionally, U.S. Pat. No. 4,947,541 to Toyoda et al. recites a method for producing a thin film head. The thin film head formation processes of the Toyoda et al. reference utilize conventional core formation materials. Specifically, the Toyoda et al. reference explicitly recites using conventional permalloy (NiFe) to form the upper and lower cores of a thin film head. Further, the Toyoda et al. reference recites forming the upper core of the thin film head using conventional electroplating techniques.

Prior art thin film head formation processes, such as the processes described in the above-mentioned Toyoda et al. reference, are not well suited for use with materials having high magnetic field saturation (HBsat) characteristics. HBsat materials are ideally suited for forming the upper and lower cores of a thin film inductive head. However, most HBsat materials cannot be formed into upper or lower cores using typical fabrication methods. As an example, many HBsat materials have physical characteristics rendering them unsuited for electroplating processes. Thus, such HBsat materials could not be effectively used, in the manner recited in the Toyoda et al. reference, to form the upper core of a thin film inductive head.

Thus, a need has arisen for a thin film head formation method which is not limited to use only with conventional core formation materials. A further need exists for a thin film head and a thin film head formation method which utilize advantageous HBsat materials. Still another need exists for a thin film head formation method which utilizes advantageous HBsat materials but which does not suffer from increased magnetostriction associated with conventional HBsat materials.

DISCLOSURE OF THE INVENTION

The present invention provides a thin film head formation method which is not limited to use only with conventional core formation materials. The present invention further provides a thin film head and a thin film head formation method which utilize advantageous HBsat materials. The present invention also provides a thin film head formation method which utilizes advantageous HBsat materials but which does not suffer from increased magnetostriction associated with conventional HBsat materials.

More specifically, in one embodiment, the present invention recites forming a cavity in a dielectric layer. Next, a layer of high magnetic field saturation (HBsat) material is sputter-deposited over the dielectric layer such that the HBsat material is deposited into the cavity formed in the dielectric layer. The cavity in the dielectric layer functions as a mold or "stencil" for the HBsat material. The HBsat material deposited into the cavity is used to form the first core of a thin film head. After the formation of the first core of the thin film head, a gap layer of material is deposited above the dielectric layer and above the first core. Next, a layer of HBsat material is sputter-deposited above the gap layer of material and above the first core of the thin film head. The layer of HBsat material sputter-deposited above the gap layer of material and above the first core is used to form the second core of the thin film head. Hence, this invention forms first and second cores of a thin film head using sputter-deposition processes. As a result, selected HBsat materials which were not well suited to conventional thin film head formation methods can now be used to form the cores of thin film head structures.

In other embodiments, the present invention specifically recites the formation of the above-mentioned cavity in the dielectric layer. In one such embodiment, the present invention first surrounds a sacrificial metal structure with the above-mentioned dielectric layer. Next, the present embodiment removes the sacrificial metal structure. In so doing, an opening remains in the dielectric layer. In this embodiment, the opening defines the cavity in the dielectric layer.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1A:
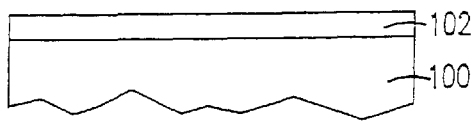
FIGS. 1A, 1B, 1C, 1D, 1E, IF, 1G, 1H, 1I, 1J, 1K, 1L, 1M, 1N, and 1O are side sectional views illustrating process steps employed during the fabrication of a stencil-defined thin film magnetic structure in accordance with the present claimed invention.

With reference now to FIGS. 1A–1O, side sectional views illustrating process steps employed during the fabrication of a stencil-defined thin film magnetic structure in accordance with the present claimed invention are shown. As shown in FIG. 1A, the following description of the formation of the present stencil-defined thin film magnetic structure begins with layer 100. It will be understood, however, that in thin film magnetic structures such as magnetoresistive (MR) heads, giant magnetoresistive (GMR) heads, and spin valve heads, various other layers will underlie layer 100. These various underlying layers (e.g. shield 1, read gap 1, read gap 2) are not shown in FIGS. 1A–1O for purposes of clarity. In the present embodiment, layer 100 comprises a shield 2 layer of a thin film head. In this embodiment, layer 100 is comprised, for example, of permalloy and has a thickness of approximately 1–3 microns.

Referring still to FIG. 1A, the present embodiment deposits a buffer layer 102 above layer 100. In this embodiment buffer layer is comprised, for example, of approximately 100–1000 angstroms of a suitable material such as tantalum, chromium, and the like.

Figure 1F:
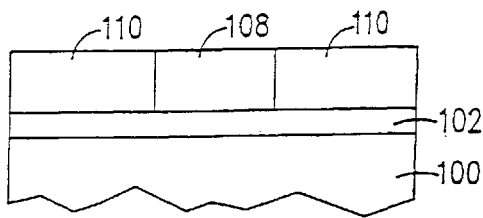
Figure 1B:
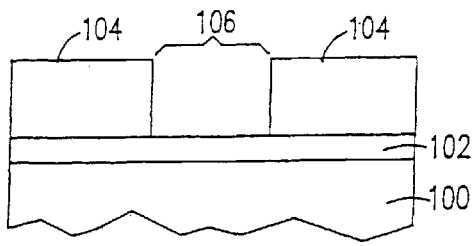

Next, as shown in FIG. 1B, the present embodiment deposits a layer 104 of photosensitive material (e.g. photoresist) above buffer layer 102. After subsequent exposure and etching steps, an opening 106 is formed in layer 104 of photosensitive material.

Figure 1G:
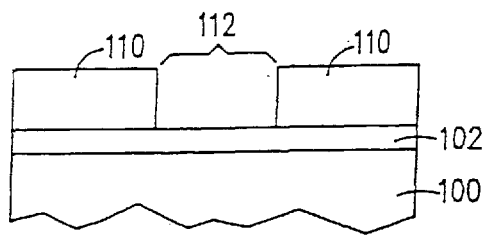
Figure 1C:
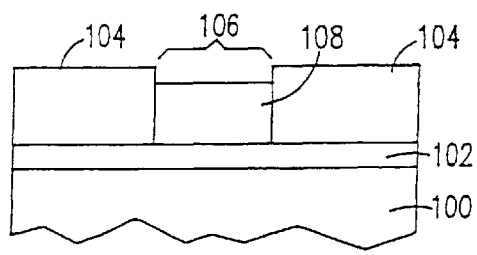

With reference now to FIG. 1C, a sacrificial metal structure 108 is formed within opening 106 of layer 104 of photosensitive material. More specifically, in this embodiment, sacrificial metal structure 108 has a thickness of approximately several microns. Sacrificial metal structure 108 is further comprised of, for example, permalloy, copper, chromium, and the like which is electroplated onto buffer layer 102. In the present embodiment, for a reason which will be described below, sacrificial metal structure 108 should be formed of a material which is different than the material used to form buffer layer 102.

Figure 1H:
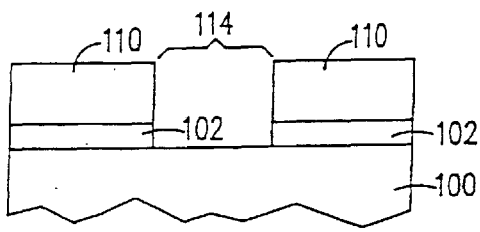
Figure 1D:
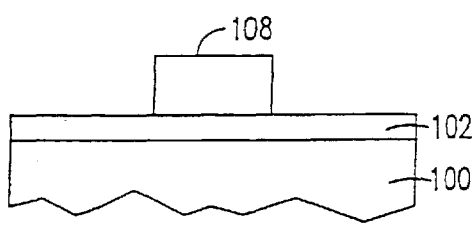

As shown in FIG. 1D, the present embodiment then removes layer 104 of photosensitive material. As a result, only sacrificial metal structure 108 remains disposed above buffer layer 102.

Figure 1I:
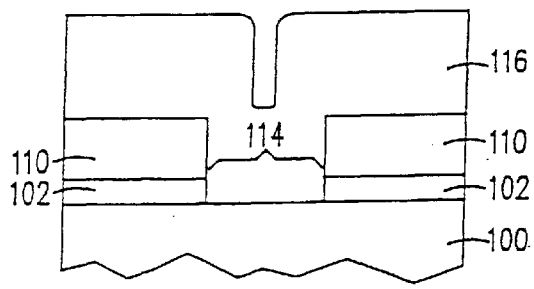
Figure 1E:
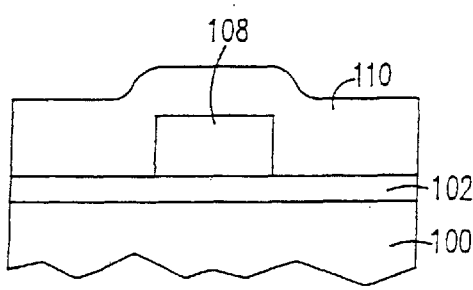

In the step of FIG. 1E, after the removal of layer 104 of photosensitive material, a dielectric layer 110 is deposited above buffer layer 102 and sacrificial metal structure 108. In so doing, sacrificial metal structure 108 is surrounded by dielectric layer 110. In this embodiment, dielectric layer 110 is comprised of alumina ($Al_2O_3$). The present invention is, however, well suited to the use of various of dielectric materials such as, for example, silicon dioxide. Dielectric layer 110 is deposited to a depth at least as great as the thickness of sacrificial metal structure 108 (i.e. a thickness of approximately several microns).

Referring now to FIG. 1F, a lapping and planing process such as chemical mechanical polishing (CMP) is then performed to planarize dielectric layer 110 and remove dielectric material from above sacrificial metal structure 108. As a result of the CMP process, the top surfaces of dielectric layer 110 and sacrificial metal structure 108 are smooth and coplanar.

As illustrated in FIG. 1G, after the CMP process, an etching process is performed to remove sacrificial metal structure 108. As an example, in an embodiment where sacrificial metal structure 108 is comprised of permalloy, a sulfuric acid wet etch is used to remove sacrificial metal structure 108. It will be understood that in the present embodiment, the particular etchant employed will depend upon the type of metal used to form sacrificial metal structure 108. The opening formed after the removal of sacrificial metal structure 108 defines a cavity which will be used as a stencil to form a lower core of a thin film head.

Referring still to FIG. 1G, as mentioned above, in the present embodiment, sacrificial metal structure 108 should be formed of a material which is different than the material used to form buffer layer 102. In so doing, buffer layer 102 prevents overetching. That is, by using different materials for buffer layer 102 and sacrificial metal structure 108, an etchant can be selected which will etch through sacrificial metal structure 108 but which will not significantly etch buffer layer 102. As a result, buffer layer 102 functions as an etch stop and limits the etching step such that only sacrificial metal structure 108 is removed.

Now, as shown in FIG. 1H, the present embodiment then dry etches buffer layer 102 disposed at the base of opening 112. Although a dry etch is used to etch buffer layer 102 in this embodiment, the present invention is well suited to using various other etching processes to remove the desired portion of buffer layer 102. After, buffer layer 102 has been removed, a cavity 114 has been completed. Cavity 114 of the present embodiment will be used as a stencil for the formation of a lower core of a thin film head.

With reference now to FIG. 1I, after the formation of cavity 114 of FIG. 1H, the present embodiment then sputter-deposits a layer of high magnetic field saturation (HBsat) material 116 over dielectric layer 110 such that HBsat material 116 is deposited into cavity 114. In this embodiment, the HBsat material 116 deposited into cavity 114 will be used to form the lower core of a thin film head. The HBsat material 116 of the present embodiment is selected from the group consisting of cobalt zirconium tantalum (CoZrTa), cobalt zirconium nitride (CoZRN), and cobalt zirconium chromium (CoZrCr) although other alloys may be suitable. Thus, unlike prior art approaches, the present invention is not limited to use with permalloy having an altered physical composition. That is, the present invention enables the use of desired HBsat materials such as CoZrTa, CoZrN, and CoZrCr for the lower core of a thin film head. As yet another advantage, the present invention, unlike conventional thin film head processes, uses a "stencil" (i.e. cavity 114 in dielectric layer 110) to define the shape and dimensions of the lower core. In so doing, the present invention precisely controls the placement of the lower core without impact to shield 2 (100).

Figure 1J:
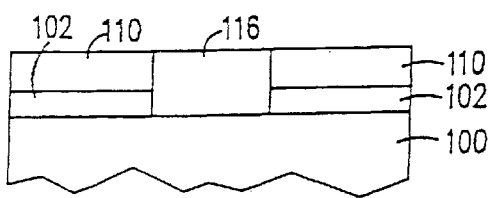

Referring now to FIG. 1J, a lapping and planing process such as CMP is then performed to planarize the HBsat material 116 and remove HBsat material 116 from above dielectric layer 110. As a result of the CMP process, the top surfaces of dielectric layer 110 and HBsat material 116 disposed in cavity 114 of FIG. 1H are smooth and substantially coplanar.

Figure 1K:
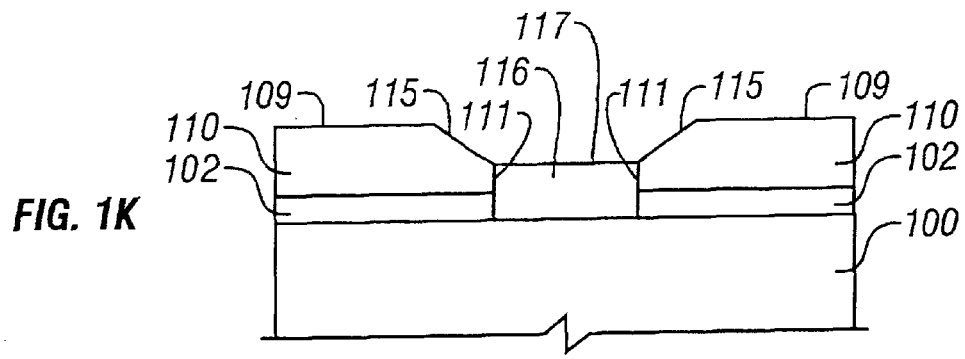

As shown in FIG. 1K, after the CMP process, the present embodiment employs, for example, ion milling to etch dielectric layer 110. Due to variations in the etch rate between dielectric layer 110 and HBsat material 116, dielectric layer 110 attains a sloped profile 115 proximate to cavity 114. The etching process is continued until HBsat material 116 deposited into cavity 114 is of a desired thickness. In this embodiment HBsat material 116 is etched until a thickness of several write gap lengths remains. The HBsat material 116 remaining in cavity 114 after the etching process comprises the lower core of the thin film head. It will be understood that various other features such as coils will be subsequently formed on the lower core. For purposes of clarity, such features are not shown in the Figures so as not to obscure aspects of the present embodiment unnecessary.

Figure 1L:
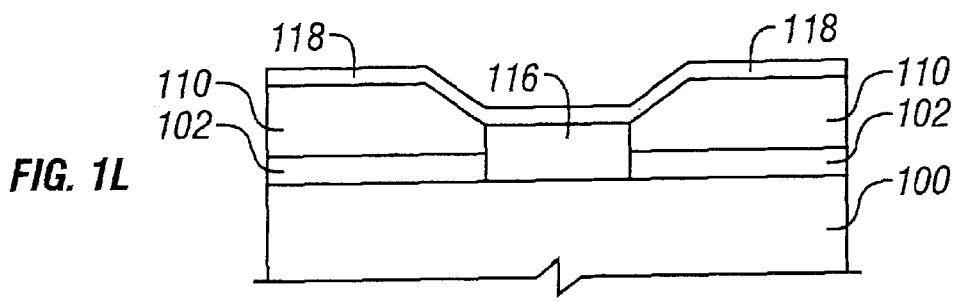

Next, as shown in FIG. 1L, gap layer 118 is deposited above dielectric layer 110 and above HBsat material 116 comprising the lower core. In this embodiment, gap layer 118 is comprised of a dielectric such as, for example, alumina. Additionally, in the present embodiment gap layer 118 has a thickness of approximately 1000–5000 angstroms. Although such a dielectric is recited in the present embodiment, the present invention is also well suited to the use of various other dielectric materials (e.g. silicon dioxide) or non-magnetic metals and to having various other thicknesses.

Figure 1M:
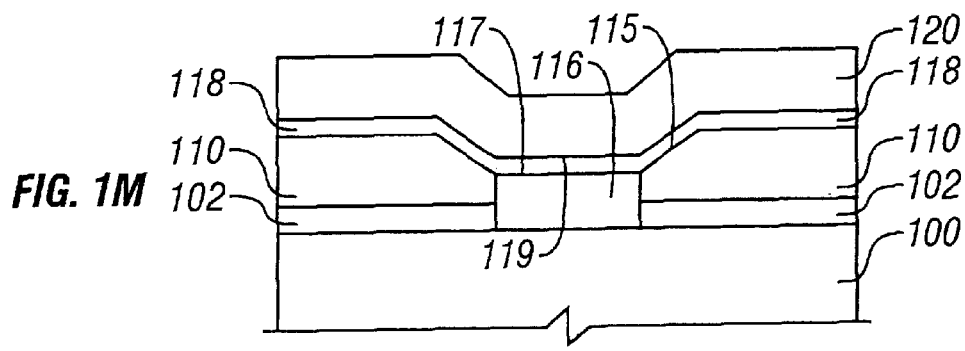

With reference now to FIG. 1M, after the formation of gap layer 118, the present embodiment sputter-deposits a layer of HBsat material 120 over gap layer 118. In this embodiment, the HBsat material 120 deposited above gap layer 118 is used to form the upper core of a thin film head. Similar to the HBsat material of lower core 116, the HBsat material 120 of the present embodiment is selected from the group consisting of cobalt zirconium tantalum (CoZrTa), cobalt zirconium nitride (CoZrN), and cobalt zirconium chromium (CoZrCr), although other alloys may be suitable. Unlike prior art methods, the present invention is not limited only to materials which can be applied using an electroplating processes. That is, unlike prior art approaches, the present invention is not limited to use with materials which may be electrochemically plated. Thus, the present invention enables the use of desired HBsat materials such as CoZrTa, CoZrN, and CoZrCr for the upper core of a thin film head. Consequently, the present invention achieves the formation of upper and lower cores in a thin film head using beneficial HBsat materials, and the present invention realizes this achievement without an unwanted increase in magnetostriction. Therefore, unlike prior art devices, the thin film magnetic structure of the present invention is capable of having upper and lower cores formed of sputtered HBsat material.

Referring still to FIG. 1M, in the present invention, the lower surface 119 of the upper core will have substantially the same width as the upper surface 117 of lower core 116. That is, due to the sloped profile 115 of dielectric layer 110 the lower surface 119 of the upper core, formed of HBsat layer 120, is confined by dielectric layer 110, and has the same width as the upper surface 117 of lower core 116. In so doing, the present embodiment eliminates upper and lower core misalignment, thereby preventing undesirable write field gradients due to the variation in the relative placement of the edges of the poletips.

Figure 1N:
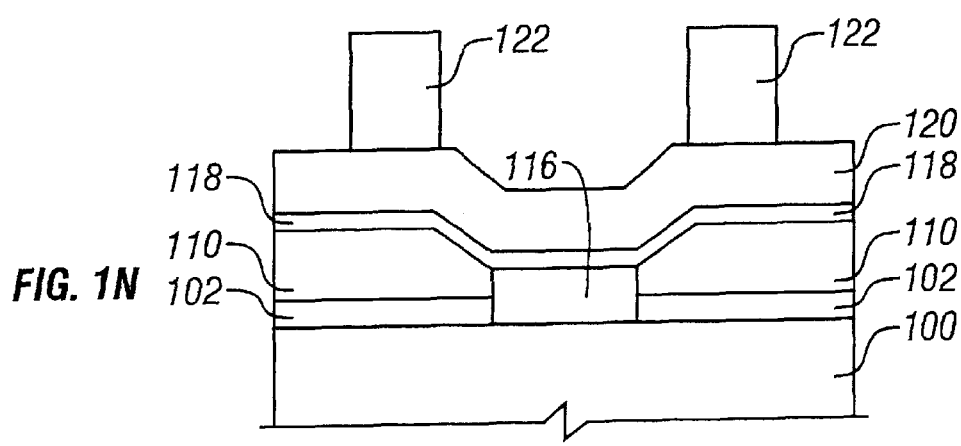
Figure 10:
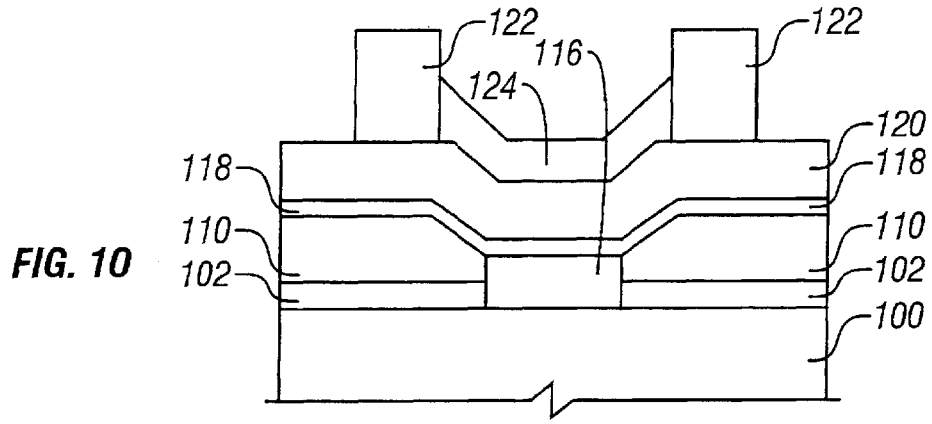

As shown in FIG. 1N, after the formation of HBsat layer 120, the present embodiment deposits a layer of photosensitive material (e.g. photoresist) above HBsat layer 120. After subsequent exposure and etching steps, plating dams 122 are formed of photosensitive material. Plating dams 122 are used to control the location where electroplating will occur in subsequent process steps.

Referring now to FIG. 1O, the present embodiment employs an electroplating process to plate a metallic layer 124 (e.g. permalloy) above HBsat layer 120. Although metallic layer 124 is shown confined between plating dams 122 in FIG. 1O, it will be understood that metallic layer 124 will also plate above HBsat layer 120 in regions outside of the area confined between plating dams 122. It will be understood that additional process steps will be employed to remove excess regions of, for example, metallic layer 124 and HBsat material 120. More particularly, regions of metallic layer 124 and HBsat material 120 which are not confined between photoresist structures 122 will be removed using, for example, ion milling, selected etchants, and the like. The process steps associated with the removal of these and other excess regions are not shown for purposes of clarity.

Thus, the present embodiment recites a stencil-defined inductive head and a method for forming such a device. The present embodiment recites sputter-depositing of the HBsat materials into a cavity (i.e. a stencil) which precisely defines the location and shape of the lower core of the thin film head. The present invention is well suited to the use of HBsat materials such as, for example, cobalt zirconium tantalum (CoZrTa), cobalt zirconium nitride (CoZrN), and cobalt zirconium chromium (CoZrCr). That is, unlike conventional processes which are limited to electroplating of permalloy, the present invention provides for the use of advantageous HBsat materials. Moreover, the HBsat (e.g. CoZrTa, CoZrN, and CoZrCr) materials utilized in conjunction with the present invention are not subject to the deleterious increase in magnetostriction associated with the prior art.

With reference now to FIGS. 2A–2K, side sectional views illustrating processes steps employed during the fabrication of a stencil-defined thin film magnetic structure in accordance with another embodiment of the present claimed invention are shown.

Figure 2A:
FIGS. 2A, 2B, 2C, 2D, 2E, 2F, 2G, 2H, 2I, 2J, and 2K are side sectional views illustrating process steps employed during the fabrication of a stencil-defined thin film magnetic structure in accordance with another embodiment of the present claimed invention.

As shown in FIG. 2A, the present embodiment of the formation of the present stencil-defined thin film magnetic structure begins with layer 200. As mentioned in conjunction with the embodiment of FIGS. 1A–1O, it will be understood, however, that in thin film magnetic structures such as MR heads, GMR heads, and spin valve heads, various other layers will underlie layer 200. These various underlying layers (e.g. shield 1, read gap 1, read gap 2) are not shown in FIGS. 2A–2K for purposes of clarity. In the present embodiment, layer 200 comprises a shield 2 layer of a thin film head. In this embodiment, layer 200 is comprised, for example, of permalloy and has a thickness of approximately 1–3 microns.

The structure of FIG. 2A also includes a dielectric layer 202 disposed above layer 200. In this embodiment, dielectric layer 202 is comprised of alumina ($Al_2O_3$). The present invention is, however, well suited to the use of various of dielectric materials such as, for example, silicon dioxide. Dielectric layer 202 is deposited to a depth of approximately several microns in this embodiment.

Figure 2B:
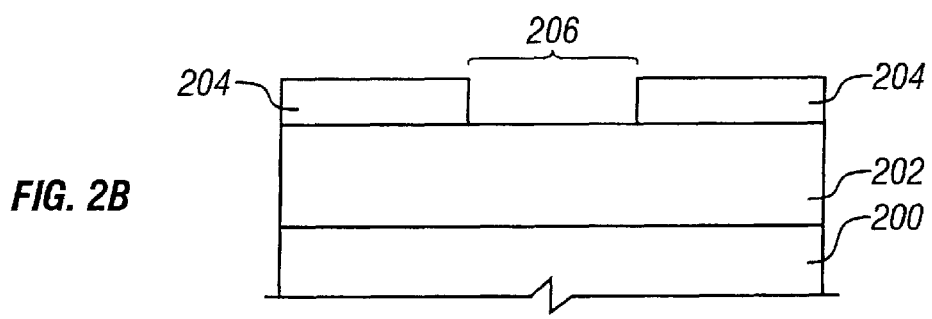

Next, as shown in FIG. 2B, the present embodiment deposits a layer 204 of photosensitive material (e.g. photoresist) above dielectric layer 202. After subsequent exposure and developing steps, an opening 206 is formed in layer 204 of photosensitive material. Opening 206 exposes a region of underlying dielectric layer 202.

Figure 2C:
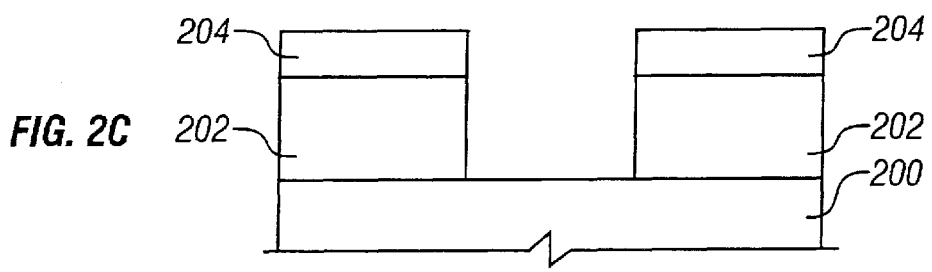

With reference next to FIG. 2C, the exposed region of dielectric layer 202 is exposed to an etching process. In this embodiment, the etching process is comprised, for example, of a reactive ion etching (RIE) process, or a reactive ion beam etching (RIBE) process, and the like. By subjecting the exposed region of dielectric layer 202 to the etching process, the present embodiment defines a cavity in dielectric layer 202.

Figure 2D:
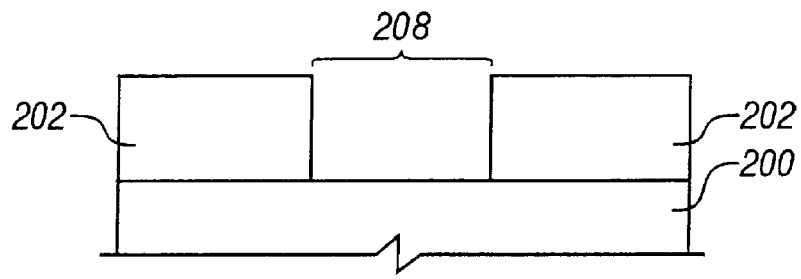

Referring now to FIG. 2D, after subjecting the exposed region of dielectric layer 202 to the etching process, the present invention removes the remaining photosensitive material disposed above dielectric layer 202. As shown in FIG. 2D, a cavity 208 is formed in dielectric layer 202. Cavity 208 is used to define the location and shape (i.e. the dimensions) of a lower core of a thin film inductive head. In this embodiment, cavity 208 is formed without the use of a sacrificial metal structure. Thus, the present embodiment, like the embodiment of FIGS. 1A–1O, uses a "stencil" (i.e. cavity 208 in dielectric layer 202) to define the shape and dimensions of the lower core. In so doing, the present invention is able to precisely control the placement of the lower core without impact to shield 2 (100).

The present embodiment then proceeds with process steps which were described in detail in conjunction with FIGS. 1I–1O. For purposes of clarity, these process steps are set forth below with the corresponding illustrations of FIGS. 2E–2K.

Figure 2E:
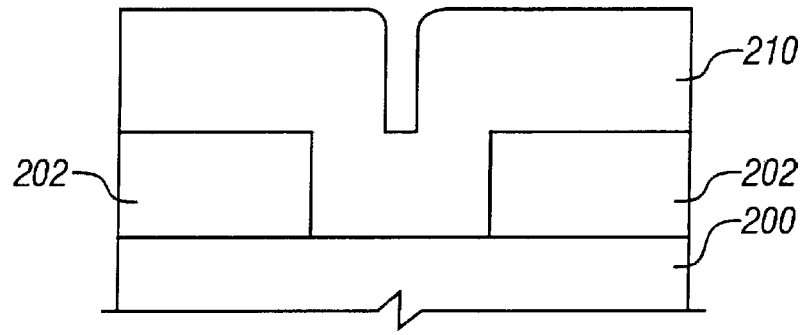

With reference now to FIG. 2E, after the formation of cavity 208 of FIG. 2D, the present embodiment then sputter-deposits a layer of high magnetic field saturation (HBsat) material 210 over dielectric layer 202 such that HBsat material 210 is deposited into cavity 208. In this embodiment, the HBsat material 210 deposited into cavity 208 will be used to form the lower core of a thin film head. The HBsat material 210 of the present embodiment is selected from the group consisting of cobalt zirconium tantalum (CoZrTa), cobalt zirconium nitride (CoZrN), and cobalt zirconium chromium (CoZrN);, although other alloys may be suitable. Thus, unlike prior art approaches, the present invention is not limited to use with permalloy having an altered physical composition. That is, the present invention enables the use of desired HBsat materials such as CoZrTa, CoZrN, and CoZrCr for the lower core of a thin film head.

Figure 2F:
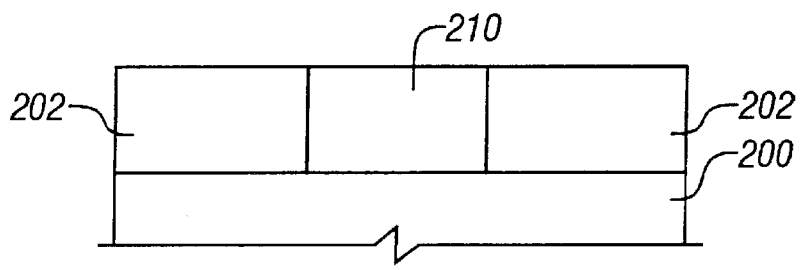

Referring now to FIG. 2F, a lapping and planing process such as CMP is then performed to planarize the HBsat material 210 and remove HBsat material 210 from above dielectric layer 202. As a result of the CMP process, the top surfaces of dielectric layer 202 and HBsat material 210 disposed in cavity 208 of FIG. 2D are smooth and substantially coplanar.

Figure 2G:
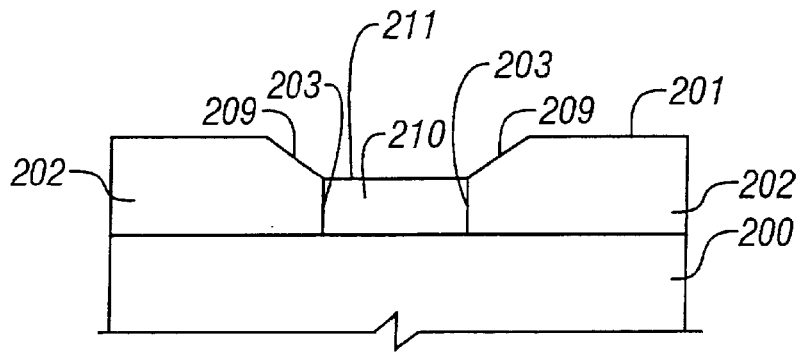

As shown in FIG. 2G, after the CMP process, the present embodiment employs, for example, ion milling to etch HBsat material 210 disposed in cavity 208 of FIG. 2D and to etch dielectric layer 202. Due to variations in the etch rate between dielectric layer 202 and HBsat material 210, dielectric layer 202 attains a sloped profile 209 proximate to cavity 208. The etching process is continued until HBsat material 210 deposited into cavity 208 is of a desired thickness. In this embodiment HBsat material 210 is etched until a thickness of several write gap lengths remains. The HBsat material 210 remaining in cavity 208 after the etching process comprises the lower core of the thin film head. It will be understood that various other features such as coils will be subsequently formed on the lower core. For purposes of clarity, such features are not shown in the Figures so as not to obscure aspects of the present embodiment unnecessarily.

Figure 2H:
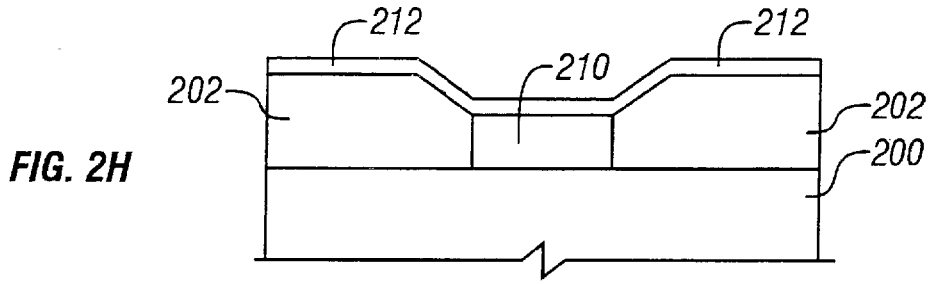

Next, as shown in FIG. 2H, gap layer 212 is deposited above dielectric layer 202 and above HBsat material 210 comprising the lower core. In this embodiment, gap layer 212 is comprised of a dielectric such as, for example, alumina. Additionally, in the present embodiment gap layer 212 has a thickness of approximately 1000–5000 angstroms. Although such a dielectric is recited in the present embodiment, the present invention is also well suited to the use of various other dielectric materials (e.g. silicon dioxide) or non-magnetic metals and to having various other thicknesses.

Figure 2I:
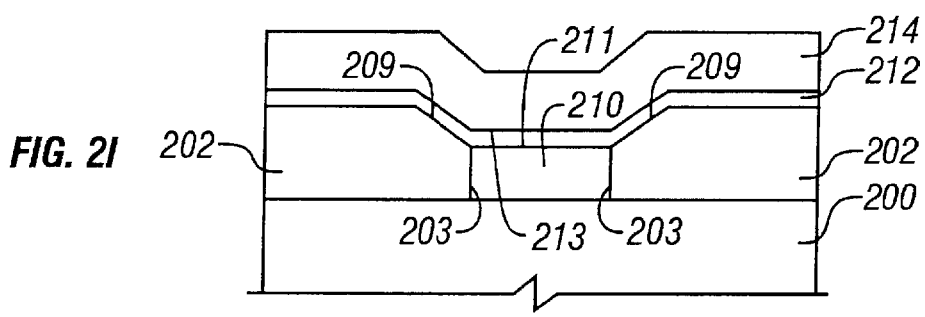

With reference now to FIG. 2I, after the formation of gap layer 212, the present embodiment sputter-deposits a layer of HBsat material 214 over gap layer 212. In this embodiment, the HBsat material 214 deposited above gap layer 212 is used to form the upper core of a thin film head. Similar to the HBsat material of lower core 210, the HBsat material 214 of the present embodiment is selected from the group consisting of cobalt zirconium tantalum (CoZrTa), cobalt zirconium nitride(CoZrN),and cobalt zirconium chromium (CoZrCr). Unlike prior art methods, the present invention is not limited only to materials which can be applied using an electroplating processes. That is, unlike prior art approaches, the present invention is not limited to use with permalloy having an altered physical composition. Thus, the present invention enables the use of desired HBsat materials such as CoZrTa, CoZrN, and CoZrCr for the upper core of a thin film head. Consequently, the present invention achieves the formation of upper and lower cores in a thin film head using beneficial HBsat materials, and the present invention realizes this achievement without an unwanted increase in magnetostriction.

Referring still to FIG. 2I, in the present invention, the lower surface 213 of the upper core will have substantially the same width as the upper surface 211 of lower core 210. That is, due to the sloped profile 209 of dielectric layer 202 the lower surface 213 of the upper core, formed of HBsat layer 120, is confined by dielectric layer 202, and has the same width as the upper surface 211 of lower core 210. In so doing, the present embodiment eliminates upper and lower core misalignment, thereby preventing problems such as undesirable write field gradients due to variation in the relative placement of the edges of the poletips.

Figure 2J:
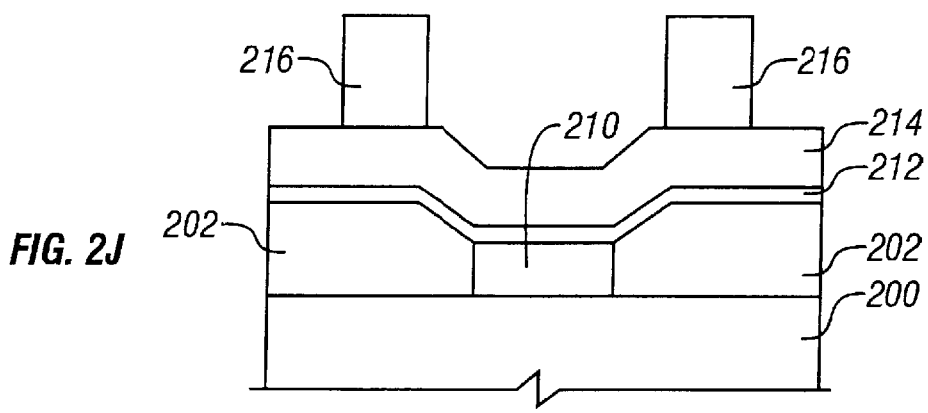

As shown in FIG. 2J, after the formation of HBsat layer 214, the present embodiment deposits a layer of photosensitive material (e.g. photoresist) above HBsat layer 214. After subsequent exposure and etching steps, plating dams 216 are formed of photosensitive material. Plating dams 216 are used to control the location where electroplating will occur in subsequent process steps.

Figure 2K:
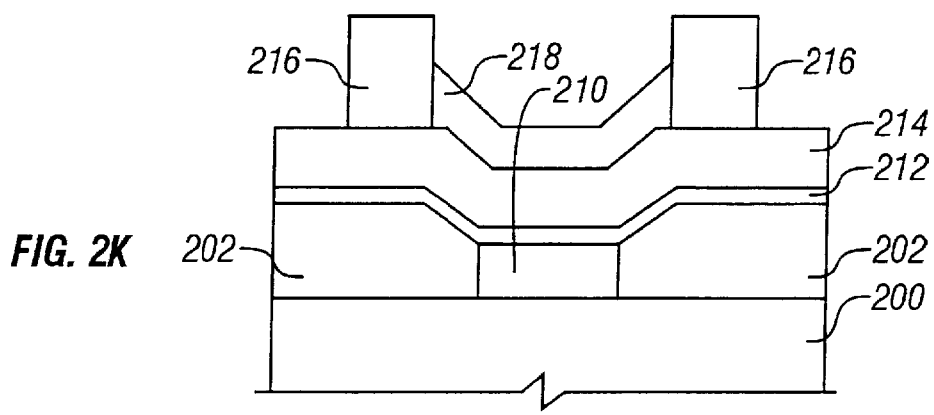

Referring now to FIG. 2K, the present embodiment employs an electroplating process to plate a metallic layer 218 (e.g. permalloy) above HBsat layer 214. Although metallic layer 218 is shown confined between plating dams 216 in FIG. 2K, it will be understood that metallic layer 218 will also plate above HBsat layer 214 in regions outside of the area confined between plating dams 216. It will be understood that additional process steps will be employed to remove excess regions of, for example, metallic layer 218 and HBsat material 214. More particularly, regions of metallic layer 218 and HBsat material 214 which are not confined between photoresist structures 216 will be removed using, for example, selected etchants and the like. The process steps associated with the removal of these and other excess regions are not shown for purposes of clarity.

Thus, the present invention provides a thin film head formation method which is not limited to use with conventional core formation materials only. The present invention further provides a thin film head and a thin film head formation method which utilize advantageous HBsat materials. The present invention also provides a thin film head formation method which utilizes advantageous HBsat materials but which does not suffer from increased magnetostriction associated with conventional HBsat materials.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the Claims appended hereto and their equivalents.

What is claimed is:

1. A stencil-defined thin film head comprising:

a dielectric layer having a top surface, said dielectric layer having an opening therethrough, said opening being defined by first, second, third and fourth sidewalls, said first and second sidewalls being substantially perpendicular to said top surface and defining a non-sloped portion of said opening, said third and fourth sidewalls extending upwardly from said first and second sidewalls to join said top surface and defining a sloped portion of said opening;

a buffer layer disposed beneath said dielectric layer, said buffer layer having an opening therethrough substantially aligned with said non-sloped portion of said opening through said dielectric layer, wherein said lower core is disposed within said substantially non-sloped portion of said opening through said dielectric layer and within said opening through said buffer layer;

a lower core disposed within said substantially non-sloped portion of said opening;

a non-planar write gap layer disposed over said dielectric layer and said lower core; and an upper core, formed of a HBsat material, disposed over said write gap layer.

2. The stencil-defined thin film head of claim 1 further comprising:

a metallic layer disposed above said upper core.

3. The stencil-defined thin film head of claim 1 wherein said lower core is formed of a HBsat material.

4. The stencil-defined thin film head of claim 3 wherein said lower core HBsat material is selected fom the group consisting of cobalt zirconium tantalum, cobalt zirconium nitride, and cobalt zirconium chromium.

5. The stencil-defined thin film head of claim 1 wherein said upper core HBsat material is selected from the group consisting of cobalt zirconium tantalum, cobalt zirconium nitride, and cobalt zirconium chromimn.

6. The stencil-defined thin film head of claim 2 wherein said metallic layer comprises a nickel-iron alloy.

7. The stencil-defined thin film head of claim 1 wherein said buffer layer is formed of a metal selected from the group consisting of tantalum and chromium.

8. The stencil-defined thin film head of claim 1 wherein said buffer layer has a thickness in the range of approximately 100–1000 angstroms.

9. The stencil-defined thin film head of claim 1 wherein said write gap layer has a thickness in the range of approximately 1000–5000 angstroms.

10. The stencil-defined thin film head of claim 1 further comprising:

a metallic layer disposed above said upper core.

* * * * *

UNITED STATES PATENT AND TRADEMARK OFFICE
CERTIFICATE OF CORRECTION

PATENT NO.    : 6,445,536 B1
DATED         : September 3, 2002
INVENTOR(S)   : Rudy et al.

It is certified that error appears in the above-identified patent and that said Letters Patent is hereby corrected as shown below:

Column 10,
Line 5, replace "fom", with -- from --;
Line 33, replace "chromimn", with -- chromium --.

Signed and Sealed this

Twenty-fifth Day of February, 2003

JAMES E. ROGAN
*Director of the United States Patent and Trademark Office*